United States Patent
Biondi et al.

(10) Patent No.: US 12,130,172 B2
(45) Date of Patent: Oct. 29, 2024

(54) DEVICE AND METHOD FOR INSPECTING CONTAINERS

(71) Applicant: G.D S.p.A., Bologna (IT)

(72) Inventors: Andrea Biondi, Bologna (IT); Luca Cavazza, Bologna (IT); Luca Cerati, Bologna (IT); Claudia De Maria, Bologna (IT); Giacomo Noferini, Castenaso (IT); Stefano Sinigardi, Roncoferraro (IT); Noemi Zordan, Bologna (IT)

(73) Assignee: G.D S.p.A., Bologna (IT)

( * ) Notice: Subject to any disclaimer, the term of this patent is extended or adjusted under 35 U.S.C. 154(b) by 273 days.

(21) Appl. No.: 17/619,171

(22) PCT Filed: Jul. 8, 2020

(86) PCT No.: PCT/IB2020/056404
§ 371 (c)(1),
(2) Date: Dec. 14, 2021

(87) PCT Pub. No.: WO2021/005518
PCT Pub. Date: Jan. 14, 2021

(65) Prior Publication Data
US 2022/0307888 A1 Sep. 29, 2022

(30) Foreign Application Priority Data
Jul. 8, 2019 (IT) .......................... 102019000011109

(51) Int. Cl.
*G01G 9/00* (2006.01)
*G01G 17/00* (2006.01)
*G01G 23/01* (2006.01)

(52) U.S. Cl.
CPC ............. *G01G 9/005* (2013.01); *G01G 17/00* (2013.01); *G01G 23/01* (2013.01)

(58) Field of Classification Search
None
See application file for complete search history.

(56) References Cited

U.S. PATENT DOCUMENTS 3,534,260 A * 10/1970 Walker .................... G01N 22/04
324/643
3,815,019 A * 6/1974 Wiles ...................... G01N 22/04
324/640

(Continued)

FOREIGN PATENT DOCUMENTS

EP 2938974 A1 11/2015

OTHER PUBLICATIONS

International Search Report and Written Opinion dated Dec. 15, 2020 from counterpart International Patent Application No. PCT/IB2020/056404.

*Primary Examiner* — Marcus H Taningco
*Assistant Examiner* — Djura Malevic
(74) *Attorney, Agent, or Firm* — SHUTTLEWORTH & INGERSOLL, P.L.C.; Timothy J. Klima

(57) ABSTRACT

An inspection device for inspecting containers comprises a rotary conveyor, provided with a plurality of receiving cavities, and a measuring station configured to inspect each container while the container is being supported and moved by the conveyor, wherein the conveyor has continuous motion and the measuring station comprises a microwave detector provided with a measuring zone through which each container passes in order to generate an information item relating to at least one of the following: weight of the container as a whole or of the dose of product contained therein, type of product inside the container, presence of foreign bodies in the container.

15 Claims, 3 Drawing Sheets

(56) References Cited

U.S. PATENT DOCUMENTS

| | | | | |
|---|---|---|---|---|
| 4,297,874 A * | 11/1981 | Sasaki | G01N 22/04 | |
| | | | 324/636 | |
| 4,484,133 A * | 11/1984 | Riggin | G01N 22/04 | |
| | | | 324/637 | |
| 4,533,038 A * | 8/1985 | Richard | B65G 17/12 | |
| | | | 198/803.15 | |
| 5,397,993 A * | 3/1995 | Tews | G01N 22/04 | |
| | | | 324/636 | |
| 6,225,812 B1 * | 5/2001 | Mays | G01N 22/04 | |
| | | | 324/636 | |
| 6,496,018 B1 * | 12/2002 | Nagata | G01N 22/00 | |
| | | | 324/636 | |
| 6,617,861 B1 * | 9/2003 | Joshi | G01N 22/00 | |
| | | | 324/637 | |
| 7,151,380 B2 * | 12/2006 | Typpo | D21G 9/0027 | |
| | | | 324/634 | |
| 7,621,715 B2 * | 11/2009 | Borderi | A24C 5/356 | |
| | | | 414/810 | |
| 7,982,469 B2 * | 7/2011 | Jakkula | G01N 33/346 | |
| | | | 324/633 | |
| 8,256,432 B2 * | 9/2012 | Campagnoli | B65B 41/02 | |
| | | | 131/58 | |
| 9,625,366 B2 * | 4/2017 | El Matbouly | G01K 7/32 | |
| 9,781,778 B2 * | 10/2017 | Heineck | H05B 6/80 | |
| 9,955,536 B2 * | 4/2018 | Heineck | A43D 25/20 | |
| 11,828,716 B2 * | 11/2023 | Schmitz | G01N 22/04 | |
| 2004/0140805 A1 * | 7/2004 | Izumi | C04B 35/42 | |
| | | | 324/304 | |
| 2004/0233458 A1 * | 11/2004 | Frick | G01L 11/00 | |
| | | | 331/65 | |
| 2006/0028213 A1 * | 2/2006 | Typpo | D21G 9/0027 | |
| | | | 324/640 | |
| 2006/0097173 A1 * | 5/2006 | Christiansen | G01N 21/9027 | |
| | | | 250/339.12 | |
| 2009/0292212 A1 * | 11/2009 | Ferren | A61B 5/0205 | |
| | | | 600/481 | |
| 2010/0156439 A1 * | 6/2010 | Schroeder | G01N 22/00 | |
| | | | 324/637 | |
| 2011/0050845 A1 * | 3/2011 | Muhammed | G01J 3/2823 | |
| | | | 348/40 | |
| 2011/0193565 A9 * | 8/2011 | Schroeder | G01N 22/00 | |
| | | | 324/637 | |
| 2016/0355286 A1 * | 12/2016 | Cavazza | B29C 66/849 | |
| 2017/0327254 A1 * | 11/2017 | Cerati | B65B 29/022 | |
| 2018/0312280 A1 * | 11/2018 | Biondi | B65B 57/04 | |
| 2019/0187198 A1 * | 6/2019 | Anderson | G01R 29/0878 | |

\* cited by examiner

DEVICE AND METHOD FOR INSPECTING CONTAINERS

This application is the National Phase of International Application PCT/IB2020/056404 filed Jul. 8, 2020 which designated the U.S.

This application claims priority to Italian Patent Application No. 102019000011109 filed Jul. 8, 2019, which application is incorporated by reference herein.

TECHNICAL FIELD

This invention relates to a device and a method for inspecting containers, specifically of the type containing a pre-dosed quantity of a material in granular or powder form for making food products—for example, a lyophilized food material (meat or vegetable stock or the like) or a granulated material for making an infusion drink—and still more specifically, capsules for making such foods.

BACKGROUND ART

Typically, capsules for infusion drinks—coffee, for example—are inspected using check weighers disposed along a capsule feed line, downstream of a machine that makes the capsules. The purpose of weighing is to check that the capsules contain the desired quantity of product and that they therefore conform to a predetermined production standard.

In prior art production lines, the capsules are transferred between the different production stations (loading, dosing, sealing, etc) using trays or suitable support plates provided with housings to hold a plurality of capsules.

In prior art applications, the use of in-line check weighers involves the need to feed the capsules intermittently because weighing requires that each capsule remain on the check weigher, specifically a load cell, for a predetermined length of time.

Disadvantageously, these solutions are slow and lack flexibility. Feeding the capsules intermittently reduces the productivity of the machine and increasing the speed in the stretch where the capsule is in motion is not a desirable solution to overcome this drawback, since the capsules containing the granular or powder material are susceptible of damage on account of the high accelerations or vibrations.

Moreover, the use of support trays reduces the flexibility of the machine on account of the mutual positioning of the capsules dictated by the way the housings are distributed on the tray.

AIM OF THE INVENTION

This invention therefore has for an aim to provide a device and a method for inspecting containers to overcome the above mentioned disadvantages of the prior art.

More specifically, the aim of this invention is to provide a device and a method for inspecting containers to allow an increase in productivity.

A further aim of the invention is to provide a device and a method for inspecting containers to improve overall operating flexibility.

These aims are fully achieved by a device and a method for inspecting containers according to this invention, as disclosed herein.

BRIEF DESCRIPTION OF THE DRAWINGS

The technical features of the invention, with reference to the above aims, are clearly described in the appended claims and its advantages are more apparent from the detailed description which follows, with reference to the accompanying drawings which illustrate a preferred, non-limiting example embodiment of it and in which:

DETAILED DESCRIPTION OF PREFERRED EMBODIMENTS OF THE INVENTION

Figure 1:
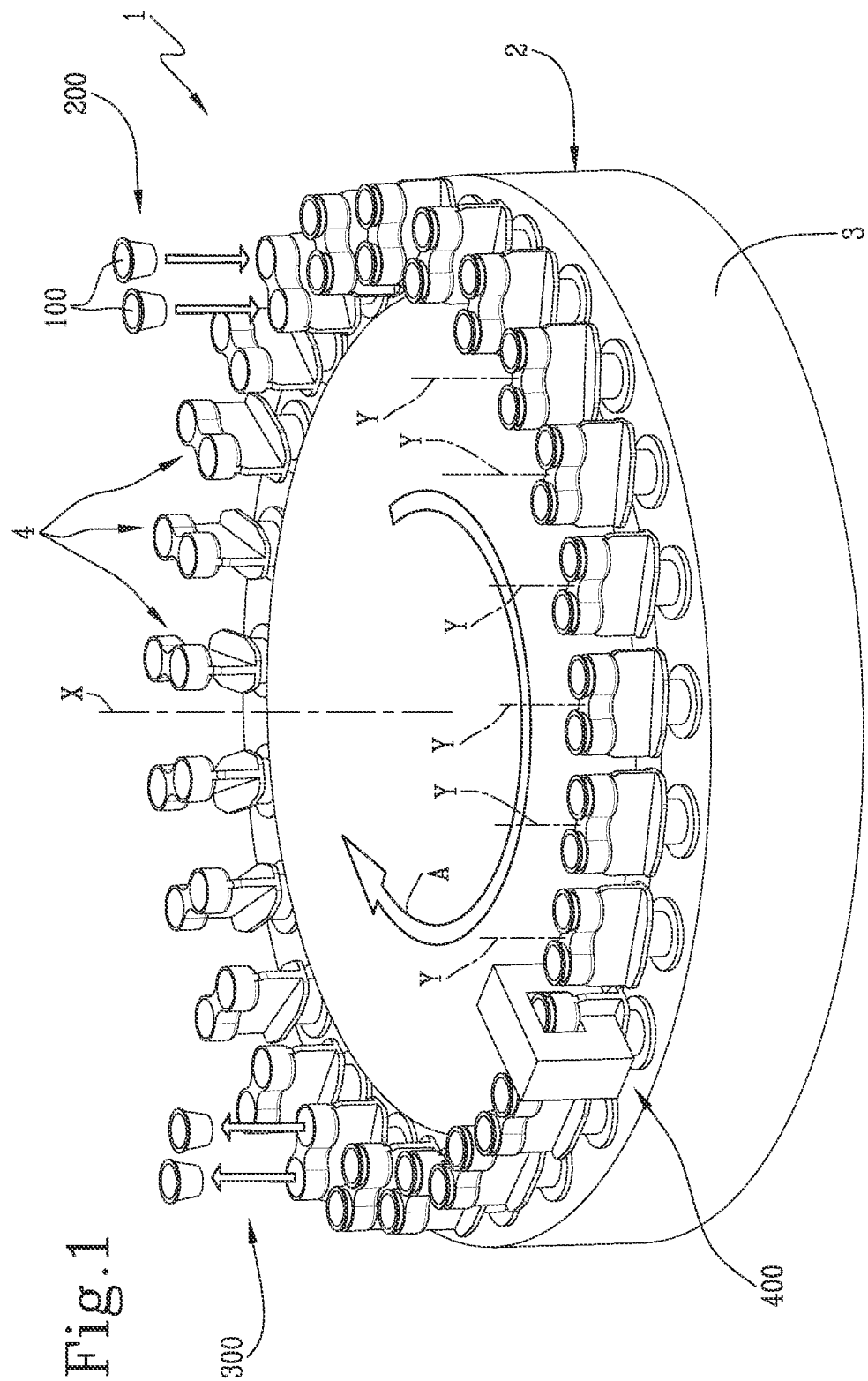
FIG. 1 shows a perspective view of a detecting device according to this invention.

The numeral 1 in the accompanying drawings denotes in its entirety an inspecting device according to this invention. The inspecting device 1 is configured to inspect containers 100 of the type comprising an outer case containing a pre-dosed quantity of a material in granular or powder form for making an infusion drink (coffee, tea, tisanes or the like). In a preferred embodiment, these containers are capsules for preparing drinks of this kind and may, for example, have the shape of a downwardly tapering "cup".

The invention applies to unsealed containers, hence, for example, upstream of a station for applying a lid in order to close the outer case, or it may apply to containers that have already been sealed. Preferably, these containers are of non-metallic type.

The device 1 comprises a conveyor 2 in the form of a rotary carousel provided with a turntable 3 which rotates about a vertical axis of rotation X and on which a succession of supports 4 are disposed.

More specifically, the conveyor 2 has the function of transporting a succession of containers 100 of the type described above along a feed path A between a loading station 200 and an unloading station 300 by way of a measuring station 400 configured to perform an electromagnetic, contactless inspection on the individual containers 100.

The above mentioned supports 4 are distributed uniformly around the axis of rotation X of the turntable 3, specifically in a peripheral zone thereof, and extend away from the turntable 3 transversely to the feed path A, specifically along respective directions parallel to the axis of rotation X.

At the top of it, each support 4 is provided with one or more receiving cavities 5 configured to receive respective containers 100. In the embodiment illustrated, each support 4 is provided at the top of it with two receiving cavities 5: there may, however, be any number of receiving cavities 5 (one or more than two).

Preferably, the two or more receiving seats 5 of the same support 4 are aligned with each other in a single line for reasons that will become clearer as this description continues.

Figure 2:
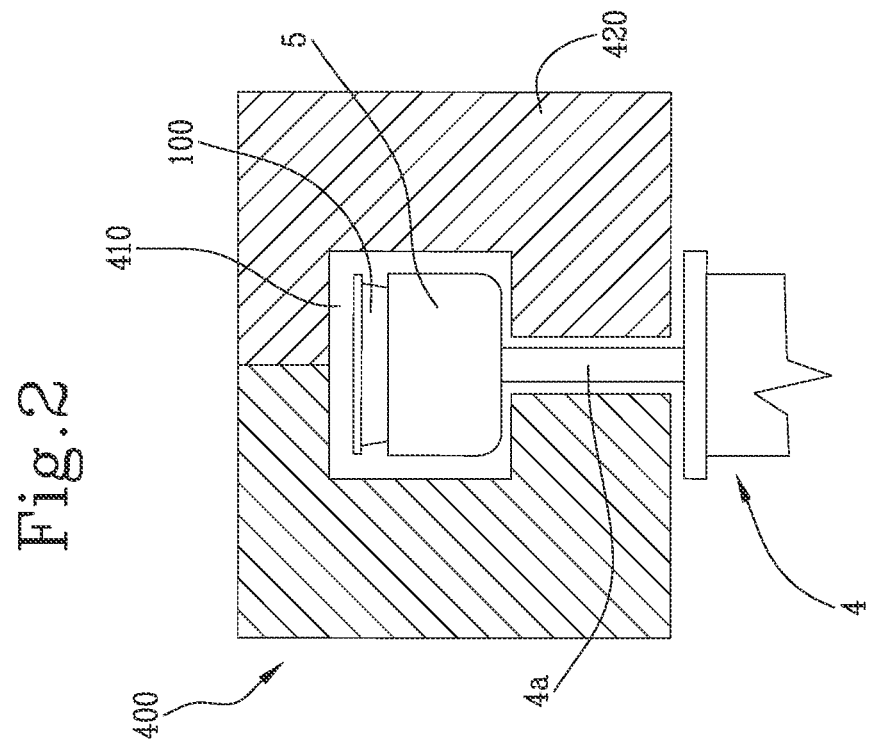

Each receiving cavity 5 is configured in the form of an open top "cup" which holds a respective container 100 by gravity by at least one bottom portion of the container 100 itself, as shown in FIGS. 1 and 2.

According to an advantageous aspect of the invention, each support 4 is mounted on the turntable 3 (or on a generic transporting element of the conveyor 2) rotatably about a respective swivel axis Y parallel to the axis of rotation X of the turntable 3. In such a configuration, the support 4 may adopt at least a first position (visible in the loading and unloading stations 200 and 300 in FIG. 1), where the receiving cavities 5 of the same support 4 are disposed in alignment, transversely, preferably perpendicularly, to the feed path A, and a second position (visible in the measuring station 400 in FIG. 1), where the receiving cavities 5 of the same support 4 are aligned with each other in succession along the feed path A in such a way that they pass through the measuring station 400 one by one.

The supports 4 can be rotated about the respective swivel axes Y by respective independent actuators (for example, independently controllable electric motors) or by a mechanical transmission (for example, a cam system housed inside the turntable 3).

In order to simultaneously load and simultaneously remove two or more containers 100 in the loading and unloading stations 200 and 300, respectively, there are provided suitable loading and unloading means (not illustrated) equipped with jaws which are configured to simultaneously grip and release two or more containers 100 and which are mounted on respective operating units of respective transfer wheels. The jaws are disposed in such a way as to release and pick up two or more containers 100 simultaneously while the containers are aligned in accordance with the aforementioned first position.

Furthermore, looking in more detail, each support 4 has a plate-shaped intermediate portion 4a (disposed between its lower portion, which is rotatably connected to the turntable 3, and its upper portion, which is provided with the aforementioned receiving cavities 5) lying predominantly in a plane that is parallel to the direction of mutual alignment of the receiving cavities 5 (FIGS. 1 and 2).

In a variant embodiment, the movement of the support 4 about its swivel axis Y might not be a swivelling movement between two end positions (that is to say, where the rotation is reversed) but it might be a full rotation, always in the same direction and, if necessary, intermittent.

Furthermore, in an embodiment (not illustrated) in which each support 4 has only one receiving cavity 5, the aforementioned rotation of the support 4 about its swivel axis Y might not be present because it would not be necessary.

The measuring station 400 is configured to measure each container 100 while the container 100 is being supported and moved (preferably with continuous motion—that is to say, at a constant speed or tangential speed) by the conveyor 2. For this purpose, the conveyor 2 is set in rotation at a constant angular speed.

More in detail, the measuring station 400 comprises a microwave detector provided with a measuring zone 410 through which each container 100 passes, in accordance with a feed logic whereby the measuring zone 410 is crossed by one container 100 at a time.

Preferably, the measuring station 400 comprises a single microwave detector through which a succession of containers 100, aligned in a single longitudinal line, pass in such a way that the containers 100 pass through the microwave detector one at a time.

Preferably, the microwave detector is a resonator and the measuring zone 410 is a resonant cavity.

Figure 3:
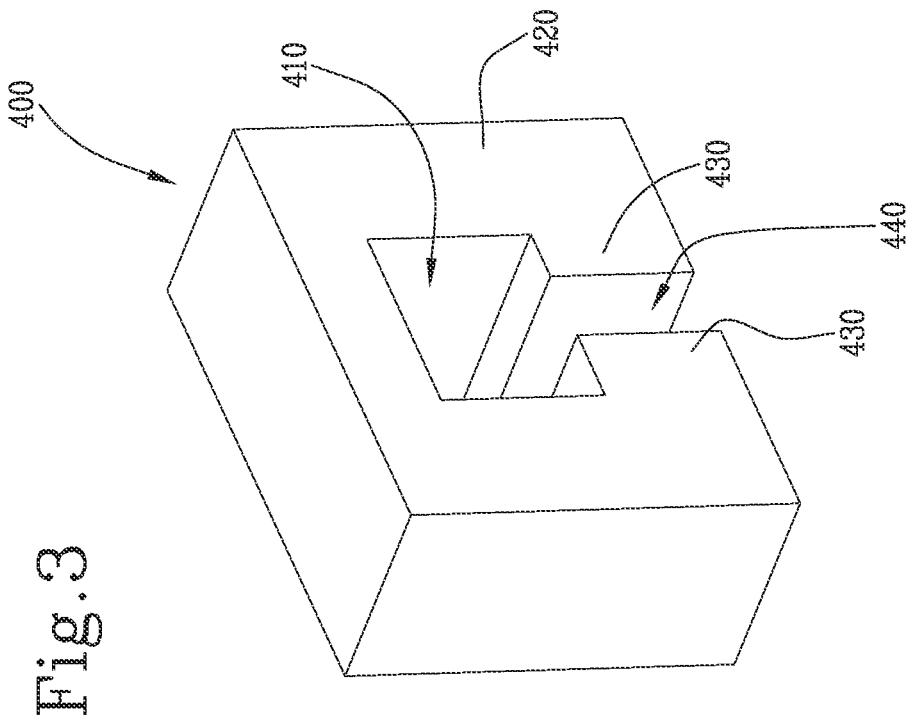
FIGS. 2 and 3 show, respectively, a cross section and a perspective view of a microwave detector used in the device of FIG. 1.

The microwave detector preferably also comprises a waveguide element 420 having a shape such as to encircle the measuring zone 410, preferably the shape of a U or a C whose opening faces down (that is to say, towards the conveyor 2). In detail, as may be seen in FIGS. 2 and 3, the waveguide element 420 of the microwave detector is substantially in the shape of a ring, whose interior defines a cavity—that is to say, the measuring zone 410.

The waveguide element 420 has two facing ends 430 defining between them a gap 440 through which the supports 4 pass one after the other.

The gap 440, facing towards the conveyor 2, measured perpendicularly to the feed path A, is smaller in size (or in width) than the measuring zone 410, so that the measuring zone 410 is partly delimited at the bottom by the above mentioned ends 430.

Further, the plate shaped intermediate portion 4a of each support 4 is smaller in thickness than the gap 440 so that the intermediate portion 4a can pass through the gap 440 when the corresponding support 4 adopts the aforementioned second position (FIG. 2).

Advantageously, the device 1 also comprises a processing unit (not illustrated) configured to receive a measurement signal from the microwave detector and to generate an information item relating to at least one property of the content of the container.

In an embodiment, the at least one property is, or is correlated with, at least one of the following: weight of the container 100 as a whole or of the dose of product contained therein, type of product inside the container 100, presence of foreign bodies in the container 100. In a preferred selection, the property measured is at least the density or weight of the content or of the container as a whole (thus including the outer case).

More specifically, the processing unit allows identifying different properties of the container and/or of the contents thereof as detected by the microwave detector and, with reference in particular to the type of product inside the container 100, it not only allows determining the type of content (for example, distinguishing between tea, coffee or other) but it also allows distinguishing between different grades or brands of products of the same type (for example, different brands of coffee powder).

In a preferred embodiment, the step of generating the information item is carried out by comparing the measurement received from the microwave detector with a suitable selection of reference models, specifically preset reference models stored in a storage unit, following a specific calibrating procedure, for example. The reference models may refer to different values of weight and/or different types and/or properties of the product inside the container and/or different situations in which foreign bodies are present in the container, in particular by associating different "information items" with different reference measurements.

That way, the processing unit may call up one or more reference models stored in a storage unit and correlated with respective reference measurements and may then make a comparison between the reference measurements associated with these models and the real measurement received from the microwave detector, thus identifying the model that is closest to the current situation being measured.

The device described above may form part of a machine for packaging the containers and comprising a unit for the production of a succession of the containers and, downstream of it, an inspection device 1 according to the invention.

The machine also comprises a rejection device, located downstream of the inspection device 1, and a feedback control system, connected to the production unit and to the inspection device and configured to perform at least one of the following corrective actions as a function of the information item generated by the processing unit of the inspection device 1:

modifying one or more operating parameters of the production unit, in particular of a device for filling the containers (to correct any dosing or filling errors), and operating the rejection device to reject one or more containers considered non-conformant on the basis of the information item generated—for example, containers containing foreign bodies or whose weight is outside a predetermined tolerance range.

Described below is an inspection method according to the invention and, in particular, implemented by an inspection device of the type described above.

The method comprises the following steps:
- feeding a succession of containers 100 along a feed path A through a microwave measuring station 400;
- measuring each container 100 by means of microwaves while the container 100 is made to pass through the measuring station 400, to obtain a succession of measurements;
- based on each measurement, generating an information item relating to at least one of the following: weight of the container as a whole or of the dose of product contained therein, type of product inside the container, presence of foreign bodies in the container.

As the containers 100 advance along the feed path A, they are supported in groups of two or more, where the containers 100 of each group are disposed in alignment with each other; and each group is rotated about a respective swivel axis Y between the first and the second position.

Also an object of this invention is a method for calibrating an inspection device for inspecting containers, in particular capsules, each containing a dose of a product in powder or granular form for the preparation of a food product.

The inspection device that can be calibrated with the calibration method basically comprises:
- a feed conveyor for feeding the containers and configured to move the containers along a feed path;
- a measuring station located along the feed path and comprising a microwave detector to inspect each container;
- a processing unit configured to receive a measurement signal from the microwave detector and to generate an information item relating to at least one property of the container or of the dose contained therein, preferably density or weight.

The calibrating method according to this invention comprises the following steps:
- picking up one or more containers from the conveyor and transferring them to a check weigher;
- weighing the containers with the check weigher;
- determining a weight value of each of the containers using the microwave detector;
- comparing, preferably by means of the processing unit, the weight values of each container obtained with the check weigher (20) and the microwave detector;
- applying a corrective measure to the inspection device if the result of the comparison is a difference greater than a predetermined value.

Figure 4:
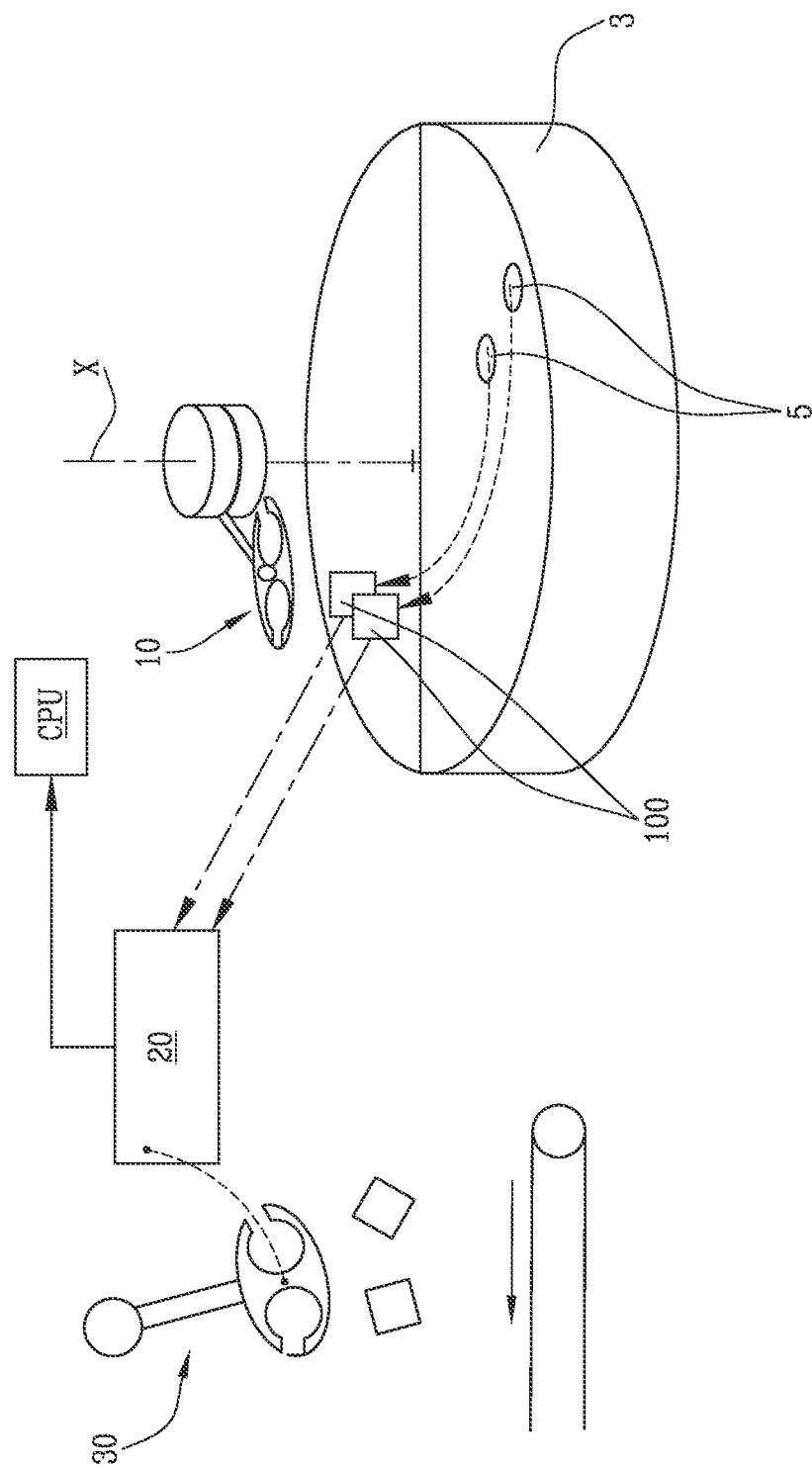
FIG. 4 schematically illustrates a container calibrating procedure according to the invention.

The inspection device 1 according to the invention may be subjected to a calibrating process as schematically represented in FIG. 4: for example, a calibrating process of the type described above.

Calibration may be carried out periodically or on demand, when required.

According to the method for calibrating the inspection device 1, one or more containers 100 are picked up from the conveyor 2 by specific pickup means 10.

In a preferred embodiment, the pickup means 10 comprise what is known as a collaborative robot of substantially known type: for example, a collaborative robot of the "delta" type.

The pickup means 10 transfer the containers 100 (for example, by means of screw conveyors or the like) to a check weigher 20 which sends its measurements of the containers 100 to the processing unit (CPU) so they can be compared with corresponding measurements taken by the microwave detector 400.

After being weighed by the check weigher 20, the containers 100 are removed by a removing device 30, which unloads the containers to an expulsion or recycling line.

The comparison (performed preferably by the processing unit) between the measurement taken with the check weigher 20 and the corresponding measurement taken with the microwave detector 400, preferably before the containers 100 are picked up from the conveyor 2 by the pickup means 10, allows identifying possible discrepancies and applying a corrective action on the inspection device 1 if the result of the comparison is a difference greater than a predetermined value.

According to a further aspect of the invention, a reference control check of the device 1 is performed. According to the reference control check, the inspection method is applied to one or more reference pieces (made, for example, of high-density polyethylene or PEEK) having precise, well-known properties and having the same shape as the regular containers inspected.

Loading and removing the reference pieces to and from the conveyor may be done manually using the same means 10, 30 used for calibration or using dedicated means.

Once subjected to microwave measurement in the microwave detector, the measurements obtained are compared by the processing unit with corresponding reference measurements (preset and, for example, retrievable from the storage unit). In the case of differences outside a tolerance range, further diagnostic steps or corrective and/or maintenance action may be taken on the device 1. For example, a very different measurement might indicate the presence of damp in the resonant chamber, requiring adequate maintenance action.

The invention as described in the foregoing is susceptible of several variations, not expressly illustrated but all falling within the scope of the inventive concept.

In particular, the conveyor might not be a turntable but might be made in the form of a linear conveyor, a closed loop conveyor or other kind of conveyor—that is to say, a generic transporting means defining the feed path—provided always that it is equipped with a succession of supports made as described above and subject to the same considerations regarding the number of receiving cavities and the possibility of swivelling.

The present invention achieves the preset aims, overcoming the disadvantages of the prior art.

The ability of the inspection device to take measurements of individual containers by means of a contactless system, specifically electromagnetic and, still more specifically, by means of a microwave measurement system, allows productivity to be increased because the inspection device (and, by extension, the entire packaging machine) can operate with continuous motion and no longer necessarily intermittently.

Productivity is further increased by the fact that the conveyor is able to work with a double line of containers, which are longitudinally repositioned and aligned with each other only in the stretch of the feed path where they are individually inspected through microwave measurement, while loading and unloading operations are performed on pairs of containers. Moreover, this feature makes it possible to reduce the loading and unloading speed, thereby reducing the risk of damaging the containers.

Lastly, moving the containers individually, avoiding the use of trays or support plates, allows improving production efficiency because it does not require a fixed, static arrangement of the containers according to predetermined positioning arrays.

The invention claimed is:
1. An inspection device for inspecting containers, each containing a dose of a product in powder or granular form for the preparation of a food product; the device comprising:
   a conveyor including a plurality of receiving cavities for respective containers and configured to move the receiving cavities along a feed path between a loading station for loading the containers and an unloading station for unloading the containers;
   a measuring station located along the feed path between the loading station and the unloading station and configured to inspect each container while the container is being supported and moved by the conveyor;
   the measuring station comprising a microwave detector including a measuring zone through which each container passes, the device further comprising a processing unit configured to receive a measurement signal from the microwave detector and to generate an information item relating to at least one property of the container or of the dose contained therein;
   wherein the conveyor comprises a transporting element defining the feed path and a plurality of supports extending away from the transporting element transversely to the feed path, each support having two or more of the receiving cavities and being rotatable about a swivel axis to adopt at least a first position, where the receiving cavities of the support are disposed in alignment transversely to the feed path, and a second position, where the receiving cavities of the support are disposed in alignment along the feed path such that they pass through the measuring zone one after the other in succession.

2. The device according to claim 1, wherein the processing unit is configured to generate, as a function of the measurement signal received from the microwave detector, an information item relating to at least one of the following: weight or density; type of product inside the container; and/or presence of foreign bodies in the container.

3. The device according to claim 1, wherein the microwave detector comprises a waveguide element having a shape such as to encircle the measuring zone, and wherein the waveguide element has two facing ends defining between them a gap through which the supports pass, the gap, measured perpendicularly to the feed path, being smaller in size than the measuring zone through which the containers pass.

4. The device according to claim 3, wherein the waveguide element has a U or a C shape.

5. The device according to claim 1, wherein each support has a portion which is smaller in thickness than the gap and which is configured to pass through the gap when the support adopts the second position.

6. The device according to claim 1, wherein the conveyor is formed as a carousel that rotates about an axis of rotation, and wherein the swivel axis is parallel to the axis of rotation.

7. The device according to claim 6, wherein the conveyor rotates about the axis of rotation continuously.

8. The device according to claim 1, wherein the processing unit is operatively connected with a memory unit containing one or more reference models correlated with respective reference measurements and referred to different weight values of the container or of the product dose contained therein; the processing unit being configured to generate the information item by comparing the measurement received from the microwave detector with the reference models.

9. An automatic packaging machine for containers, the containers being capsules, containing a product in powder or granular form for the preparation of a food product, comprising:
   a production unit for production of a succession of containers;
   the inspection device according to claim 1, located downstream of the production unit;
   a rejection device, located downstream of the inspection device;
   a feedback control system, connected to the production unit and to the inspection device and configured to perform at least one of the following corrective actions as a function of the information item generated by the processing unit of the inspection device:
   modifying one or more operating parameters of the production unit; and
   operating on the rejection device to reject one or more containers considered non-conforming on the basis of the information item generated.

10. The device according to claim 1, wherein the containers are capsules and the at least one property of the container or of the dose is density or weight.

11. The device according to claim 1, wherein the receiving cavities of the support are disposed in alignment perpendicularly.

12. An inspection method for inspecting containers, the containers being capsules, each containing a dose of a product in powder or granular form for the preparation of a food product, the method being implemented using an inspection device and comprising the following steps:
   feeding a succession of containers along a feed path through a measuring station, provided with a microwave detector, for measuring each container;
   measuring each container with the microwave detector through the measuring station, to obtain a succession of measurements;
   based on each measurement, generating an information item relating to at least one property of the container or of the dose contained therein, the at least one property being density or weight;
   wherein the step of feeding a succession of containers along the feed path is carried out:
   by supporting the containers in groups of two or more containers and with the containers of each group disposed in alignment with each other; and
   by rotating each group about a respective swivel axis between at least a first position, obtained before and after the step of measuring with microwaves, where the containers of the group are disposed in alignment transversely, to the feed path, and a second position, held at least during the step of measuring with microwaves, where the containers of the group are disposed in alignment along the feed path in such a way that they pass through the measuring zone one after the other in succession.

13. The method according to claim 12, wherein the step of generating the information item is carried out:
   by calling up one or more reference models stored in a memory unit and correlated with respective reference measurements, the reference models being referred to different weight values of the container or of the product dose contained therein; and by generating the information item by comparing the measurement received from the microwave detector with the reference models.

14. The method according to claim 12, wherein the step of measuring each container is carried out as the container advances continuously and at a constant speed.

15. The method according to claim 12, wherein the step of generating an information item based on each measurement further comprises a step of generating an information item relating to at least one of the following: weight or density; type of product inside the container and/or presence of foreign bodies in the container.

* * * * *